US008152905B2

(12) United States Patent
Tuomas (10) Patent No.: US 8,152,905 B2
(45) Date of Patent: Apr. 10, 2012

(54) DEVICE AND METHOD FOR SEPARATING PARTICLES OUT FROM A FLUID

(75) Inventor: Göran Tuomas, Örebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 15 days.

(21) Appl. No.: 12/734,182

(22) PCT Filed: Oct. 15, 2008

(86) PCT No.: PCT/SE2008/000600
§ 371 (c)(1), (2), (4) Date: Apr. 15, 2010

(87) PCT Pub. No.: WO2009/051545
PCT Pub. Date: Apr. 23, 2009

(65) Prior Publication Data
US 2010/0206166 A1   Aug. 19, 2010

(30) Foreign Application Priority Data
Oct. 15, 2007   (SE) ...................... 0702309

(51) Int. Cl.
*B01D 45/12* (2006.01)
(52) U.S. Cl. ............ 95/271; 55/406; 55/407; 55/408; 55/409; 55/337; 55/385.1; 95/267; 95/269; 95/270
(58) Field of Classification Search ............ 55/406–409, 55/337, 385.1; 95/267, 269–271
See application file for complete search history.

(56) References Cited

U.S. PATENT DOCUMENTS

| | | | | |
|---|---|---|---|---|
| 2,031,734 | A | * | 2/1936 | Riebel, Jr. et al. ............... 55/317 |
| 3,234,716 | A | * | 2/1966 | Sevin et al. ................. 210/360.1 |
| 4,230,581 | A |   | 10/1980 | Beazley |
| 5,016,717 | A | * | 5/1991 | Simons et al. .................. 175/66 |
| 5,851,396 | A | * | 12/1998 | Saget .......................... 210/512.3 |
| 5,902,224 | A | * | 5/1999 | Bloom ............................. 494/25 |
| 7,250,066 | B2 | * | 7/2007 | Seipler ............................. 55/337 |
| 7,338,546 | B2 | * | 3/2008 | Eliasson et al. .................. 55/406 |
| 7,465,341 | B2 | * | 12/2008 | Eliasson ......................... 96/281 |
| 7,591,882 | B2 | * | 9/2009 | Harazim ......................... 95/270 |
| 7,662,220 | B2 | * | 2/2010 | Fukano et al. ................. 55/401 |
| 7,682,415 | B2 | * | 3/2010 | Mueller et al. ................. 55/434 |
| 7,731,772 | B2 | * | 6/2010 | Lagerstedt et al. ............. 55/407 |
| 7,749,310 | B2 | * | 7/2010 | Lagerstedt et al. ............ 95/270 |
| 7,811,347 | B2 | * | 10/2010 | Carlsson et al. ................ 55/406 |
| 7,824,459 | B2 | * | 11/2010 | Borgstrom et al. ............. 55/406 |

(Continued)

*Primary Examiner* — Jason M Greene
*Assistant Examiner* — Dung H Bui
(74) *Attorney, Agent, or Firm* — Mark P. Stone (57) ABSTRACT

Device (34) for separating particles and/or drops of solid/fluid material out of a fluid, which device has a cyclone (14) with an inlet (16) and an outlet (28). The device also has a centrifuge (36) that is arranged to separate particles and/or drops of solid/fluid material from the outlet fluid in the cyclone (14). The centrifuge (36) is located downstream of the cyclone (14) and is located in the cyclone (14). The centrifuge's axis of rotation is arranged to extend in the same direction as the cyclone's axis of rotation. The centrifuge (25) has a plurality of lamellae (40) that is arranged coaxially on a shaft (42) at a distance from one another so that fluid channels are formed between adjacent lamellae (40) and so that fluid flows in between adjacent lamellae (40) in a direction from the lamellae's periphery (40*p*) towards the shaft (42) when the centrifuge (36) is in use.

24 Claims, 10 Drawing Sheets

U.S. PATENT DOCUMENTS

2003/0233939 A1* 12/2003 Szepessy et al. ................ 95/270
2005/0198932 A1* 9/2005 Franzen et al. ................ 55/406
2007/0163215 A1* 7/2007 Lagerstadt ................ 55/406

* cited by examiner

PRIOR ART

Fig. 1

PRIOR ART

DEVICE AND METHOD FOR SEPARATING PARTICLES OUT FROM A FLUID

TECHNICAL FIELD

The present invention concerns a device and a method for separating solid/fluid material from a fluid. The present invention also concerns a dust separator that comprises such a device and a machine, such as a drilling machine, that comprises such a device or such a dust separator.

BACKGROUND OF THE INVENTION

Demolition, drilling, detonation, building and mining work can create large amount amounts of dust. On undertaking such work, suitable breathing protection is required for workers as well as equipment that reduces the spread of dust to the surrounding air. Most drilling rigs today are equipped with a dust separator.

A dust separator for a rock drilling machine often comprises a cyclone. A gas flow that contains dust is fed into the cyclone at an angle and is rotated at high speed. The centrifugal force that arises due to the circular flow forces throws particles of dust towards the cyclone's inner wall. After the particles of dust have hit the wall, they fall down into the lower part of the cyclone. The lower part of the cyclone can for example comprise a dust outlet that can be opened using a one way valve, such as a rubber tube whose sides have been pressed together. When a lot of dust particles have collected in the cyclone, they will, due to the action of gravity, be forced through the rubber tube whose sides have been pressed together. Dust can fall into a sack or a container that is located under the cyclone, which sack or container can be emptied when the cyclone is not in use.

A double vortex is created in the cyclone when it is in use. A main vortex, that is directed downwards, carries the coarser/heavier particles of dust. An inner vortex, that is created in the lower part of the cyclone and that is directed upwards, carries the finer/lighter particles of dust to an outlet in the cyclone's upper part. The finer/lighter particles of dust are often sucked up by a dust sucker via a suction hose that is connected to the outlet in the cyclone's upper part.

The French patent application no. FR 2 479 505 discloses a device that comprises a cyclone and a centrifuge whereby the centrifuge is located upstream of the cyclone. The coarser/heavier particles of dust in the incoming gas flow will therefore have an eroding effect on the centrifuge's components. Maintenance and replacement of the centrifuge's components will therefore increase running costs.

The above-referenced French patent application also discloses a device in which a centrifuge is located downstream of the cyclone. The centrifuge's axis of rotation extends horizontally. In such an embodiment some of the dust particles will be thrown upwards out of the centrifuge and the force of gravity will again pull these dust particles into the centrifuge, which reduces the efficiency of the centrifuge and causes unnecessary wear of the centrifuge's components.

SUMMARY OF THE INVENTION

An object of the present invention is to provide an improved device for separating solid/fluid material out of a fluid.

The expression "particles and/or drops of solid/fluid material" means all particles of solid material or liquid drops, which particles/drops have a density greater than the density of the carrying fluid, such as particles of dust, soot, and/or liquid drops, such as oil.

This object is achieved by a device, which comprises a cyclone with at least one inlet and an outlet. The device also comprises a centrifuge that is arranged to separate particles and/or drops of solid/fluid material from the outlet fluid in said cyclone. The centrifuge is located downstream of the cyclone and is located in the cyclone. The centrifuge's axis of rotation is arranged to extend in the same direction as the cyclone's axis of rotation and the centrifuge comprises a plurality of lamellae that is arranged coaxially on a shaft at a distance from one another so that fluid channels are formed between adjacent lamellae and so that fluid flows in between adjacent lamellae in a direction from the lamellae's periphery towards said shaft when said centrifuge is in use.

Such a device provides efficient separation of solid/fluid material out of a fluid. The fluid that leaves the device is substantially dust-free and can be further supplied for use in some application or it can be released into the surroundings. Furthermore, due to the fact that the coarsest/heaviest particles of solid material are separated out of the fluid by the cyclone before these particles reach the centrifuge, wear of the centrifuge's components, which are consequently only subjected to the finest/lightest particles in the fluid, is reduced.

It should be noted that even though expressions such as "upwards and downwards" have been used in this document, the device according to the present invention can be oriented in any way, even though it is most advantageous to orient the device with the cyclone's and the centrifuge's axes of rotation extending substantially vertically (so that the force of gravity can be utilized to separate solid/fluid material out of a fluid). Furthermore, the device according to the present invention can be arranged to be portable, moveable or non-stationary.

According to an embodiment of the invention the device comprises means such as a fan, for creating an underpressure that forces a fluid flow through the device, i.e. firstly through the cyclone and then through the centrifuge. As an alternative to underpressure in the device's outlet, an overpressure in the device's inlet can force the fluid through the device. For example, a fluid can be forced into the device's inlet using a compressor or a pump.

According to another embodiment of the invention the device comprises an integrated fan housing that is arranged to contain a fan that creates an underpressure that forces a fluid flow through the device. The fan housing protects the fan from blows and impacts which the device can be subjected to during its use and/or transportation. Alternatively, the device comprises a fan that is located outside the device.

According to a further embodiment of the invention the fan is arranged downstream of the centrifuge, i.e. at/in the outlet of the device. According to an embodiment of the invention the fan and the centrifuge are driven by the same motor. According to an embodiment of the invention, when the device comprises a fan, the device comprises at least one filter that is arranged upstream or downstream of the fan. Alternatively, or additionally, the device comprises at least one filter that is arranged downstream of the centrifuge and upstream of the fan.

According to another embodiment of the invention the centrifuge is a contra-flow centrifuge.

According to a further embodiment of the invention the centrifuge's axis of rotation is coaxial with the cyclone's axis of rotation. The centrifuge's axis of rotation and the cyclone's axis of rotation can however be arranged to extend in parallel and in displaced relationship to one another.

According to an embodiment of the invention the lamellae are arranged at a right angle to the axis of rotation. Alternatively the lamellae are arranged at an inclined angle to the axis.

According to another embodiment of the invention the lamellae are arranged at a distance of 2-10 mm from each other, preferably at a distance of 3-5 mm from each other. The distance between the lamellae is adapted to optimize the centrifuge's desired function, lifetime and efficiency. Furthermore, by selecting a distance of at least 3 mm the risk of particles of solid material getting stuck between the lamellae is reduced.

According to a further embodiment of the invention at least one of the lamellae comprises at least one spacer element, such as a projection or groove on a lamella's surface, to maintain a minimum distance between adjacent lamellae. Preferably, the spacer element extends substantially from the lamella's periphery to said shaft, for example substantially radially from the lamella's periphery to the shaft.

According to an embodiment of the invention the shaft is substantially tubular, i.e. the shaft is hollow or it comprises at least one cavity that extends in the shaft's longitudinal direction. The shaft does not however necessarily have to have a circular cross section. Neither does the shaft necessarily need to have an outer wall, but it can have a grid- or a net structure on/in which lamellae are attached. Fluid is therefore forced to the radially outer region of the centrifuge, where it is brought to rotate by the centrifuge. The centrifugal force causes particles and/or drops of solid/fluid material from the outlet fluid in the cyclone to be thrown outwards towards the cyclone's inner wall. Fluid flows between the lamellae and thereafter through the hollow shaft out of the centrifuge. According to another embodiment of the invention the centrifuge's shaft is located in the centre of the centrifuge.

According to another embodiment of the invention the device comprises a cone, i.e. a cone or at least a partly cone-formed body, that is connected to said centrifugalseperator and that is arranged to rotate with it.

According to a further embodiment of the invention the cone's surface comprises at least one rib or groove to guide and force upwardly moving fluid up to the lamellae's periphery when the device is in use. The at least one rib is used to increase the rotational speed of the upwardly moving vortex, since it is the centrifugal force in the vortex flow that creates the separation effect between particles and fluid. Even the influence of erosion on the centrifuge's lamellae and any included ribs is reduced because the vortex speed is already high when the fluid flow reaches the centrifuge. According to an embodiment when the lamellae in the centrifuge lack ribs, the cone's ribs contribute to maintain/create the necessary rotational speed.

According to an embodiment of the invention at least one of the lamellae comprises at least one rib or a groove that extends substantially radially from the shaft to the at least one lamella's periphery when the at least one lamella is mounted on said shaft. The rib or the groove is used to create a column between the lamellae, and to mechanically force particles and/or drops of solid/fluid material to rotate, which subjects the particles/drops to centrifugal forces.

According to another embodiment of the invention the device comprises a collector vessel for particles and/or drops of solid/fluid material, which collector vessel is located at, or downstream of the cyclone's outlet. The collector vessel provides a secondary collection site, which results in the cyclone's geometry/function not being disturbed by a large amount of particles. According to a further embodiment of the invention the collector vessel substantially surrounds the cyclone.

According to an embodiment of the invention the cyclone's lower part comprises an outlet for solid/fluid material and an element that is arranged in the outlet. The element is arranged to rotate when the cyclone is in use and comprises at least one opening so that solid/fluid material can pass out of the cyclone and/or the centrifuge through the at least one opening in the element when the cyclone and/or the centrifuge is in use, i.e. solid/fluid material can be emptied continuously while the device is in use. It should be noted that such an element can be used in any cyclone and its use is not limited to a device according to the present invention.

Alternatively, the cyclone's lower part comprises an outlet and an element that is arranged in said outlet, which element comprises a vortex turner, i.e. means such as a cone, which facilitates reversal of the cyclone's downwardly moving vortex. According to another embodiment the element comprises stop plates that are arranged to prevent particles and/or drops of solid/fluid material outside said cyclone from being pulled into said cyclone. The aim of the stop plates is to "stop" the vortex speed of the fluid down in the collector vessel, which results in the separated particles remaining inside the collector vessel. In order to remain in the collector vessel the fluid speed in the collector vessel must be as low as possible. Such an element can be arranged to be raisable and lowerable so that the stop plates can be placed in an optimal position to achieve efficient separation of solid/fluid material out of the cyclone. For example, the stop plates can be moved upwards if less solid material, such as sand, is to be separated from the fluid in the cyclone through the cyclone's outlet, and downwards if more solid material is to be separated from the fluid in the cyclone.

According to another embodiment of the invention the element is arranged to be driven by the same motor that drives the fan (when the device comprises a fan) and/or the centrifuge, for example a shaft can connect the centrifuge's axis of rotation to the element so that they rotate together.

According to an embodiment of the invention the cyclone's outlet comprises a compressible part, such as a rubber tube, which compressible part if arranged to be compressed to thereby prevent material from passing therethrough when the device is not in use. For example, the sides of the rubber tube are sucked together when there is an underpressure in the cyclone. When the cyclone is not in use there is no underpressure whereupon the rubber tube is no longer pressed together and opens, whereupon particles of solid/fluid material that have collected at the cyclone's outlet fall out of the cyclone.

According to another embodiment of the invention the device comprises means to add a binding agent, such as water, oil or a lignine derivative, to the particles of solid/fluid material that pass through the device in order to bind the particles/drops of solid/fluid material together. The binding agent can be added to the fluid that enters the cyclone or to the fluid or particles/drops of solid/fluid material that are in the cyclone, or that leave the cyclone. The bound particles can thereafter be pressed together into tablets to facilitate their handling.

According to a further embodiment of the invention the device comprises a casing around the centrifuge, between the centrifuge and the cyclone wall, in order to protect the centrifuge from erosion. This casing can be "stationary" or rotating. If the casing rotates together with the centrifuge, a protective effect in accordance to the paragraph above may be achieved, i.e. due to faster centrifuge rotation than the fluid speed in the cyclone.

According to another embodiment of the invention the device comprises means to guide fluid out of the device without it passing through the centrifuge. A user may therefore decide whether the centrifuge should be used when the device is in use.

According to an embodiment of the invention the centrifuge comprises a lamella packet that for example contains 10-30 lamellae, with a dimension L2 in the device's longitudinal direction. Furthermore, the centrifuge comprises a first component downstream of the lamella packet with a dimension L1 in the device's longitudinal direction and a second component upstream of the lamella packet with a dimension L3 in the device's longitudinal direction. According to an embodiment of the invention L1 is 20-40 mm, L2 is 120-140 mm and L3 is 200-600 mm. L2 is measured from the upper side of the uppermost lamella in the lamella packet to the lower side of the lowermost lamella in the lamella packet. L1 is measured from the cyclone's inner ceiling to the uppermost lamella in the lamella packet. L3 is measured from the lower side of the lowermost lamella in the lamella packet to the lowest point of the centrifuge, which lowest point can for example coincide with the tip of the cone, when a cone is connected to the centrifuge.

The present invention also concerns a dust separator that comprises a device according to an embodiment of the invention and a machine, such as a drilling machine, that comprises a device or a dust separator according to an embodiment of the invention.

The present invention also concerns a method for separating particles of solid/fluid material out of a fluid. The method comprises leading a fluid containing particles of solid/fluid material into a cyclone with an inlet and an outlet. The particles and/or drops of solid/fluid material are thereafter separated from the outlet fluid in the cyclone by a centrifuge. The centrifuge is located downstream of the cyclone and is located in the cyclone. The centrifuge's axis of rotation is arranged to extend in the same direction as the cyclone's axis of rotation and the centrifuge comprises a plurality of lamellae, i.e. where the lamellae's surfaces extend parallel to one another, which lamellae are arranged coaxially on a shaft, such as a tubular central shaft at a distance from each other so that fluid channels are formed between adjacent lamellae and so that fluid flows in between adjacent lamellae in a direction from the lamellae's periphery towards said shaft when said centrifuge is in use.

The device according to an embodiment of the invention can be used in a method according to an embodiment of the invention.

According to an embodiment of the invention the particles and/or drops of solid/fluid material are separated out of said outlet fluid in the cyclone by a contra-flow centrifuge.

According to another embodiment of the invention the particles and/or drops of solid/fluid material are emptied continually from the cyclone/centrifuge using an element that is arranged in an outlet for solid/fluid material. The element is arranged to rotate when the cyclone/centrifuge is in use and comprises at least one opening so that solid/fluid material can pass out of said outlet through said at least one opening when said cyclone and/or said centrifuge is/are in use.

According to a further embodiment of the invention binding agent is added to the particles and/or drops of solid/fluid material that pass through the cyclone and/or the centrifuge.

According to an embodiment of the invention the centrifuge rotates at a speed of 3000-7000 revolutions per minute, preferably at a speed of 4000-6000 revolutions per minute.

According to another embodiment of the invention the centrifuge rotates at a speed that is higher than the fluid speed in the cyclone.

BRIEF DESCRIPTION OF THE DRAWINGS

In the following, the present invention will be described in more detail with reference to the accompanying schematic drawings, in which.

It should be noted that the drawings are not drawn to scale and that the dimensions of certain features has been exaggerated from the sake of clarity.

DETAILED DESCRIPTION OF EMBODIMENTS

Figure 1:
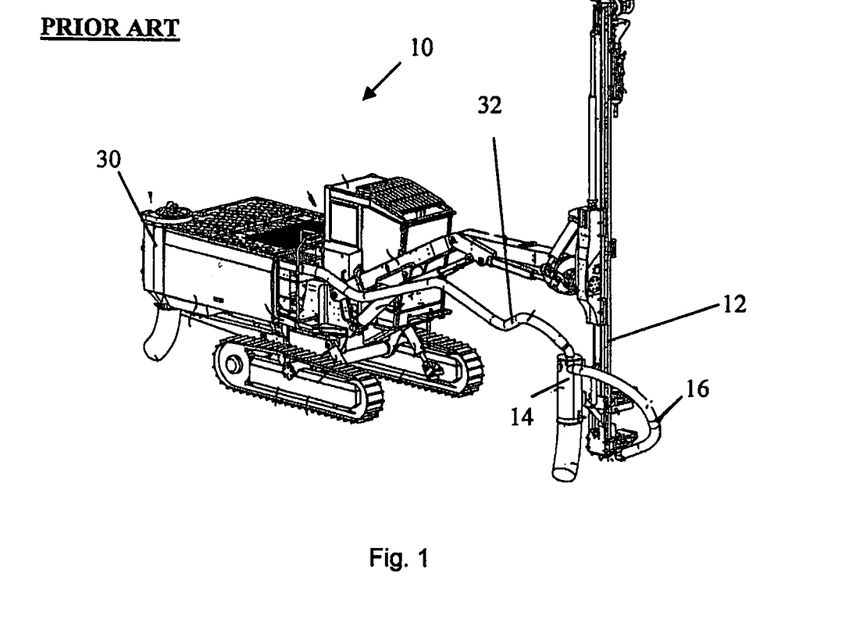
FIG. 1 shows a drilling machine according to the prior art.

FIG. 1 shows a drilling rig with a rock drilling machine 10 according to the prior art. Dust that is created during drilling with a drill 12 is fed into a cyclone 14 via a first tube 16.

Figure 2:
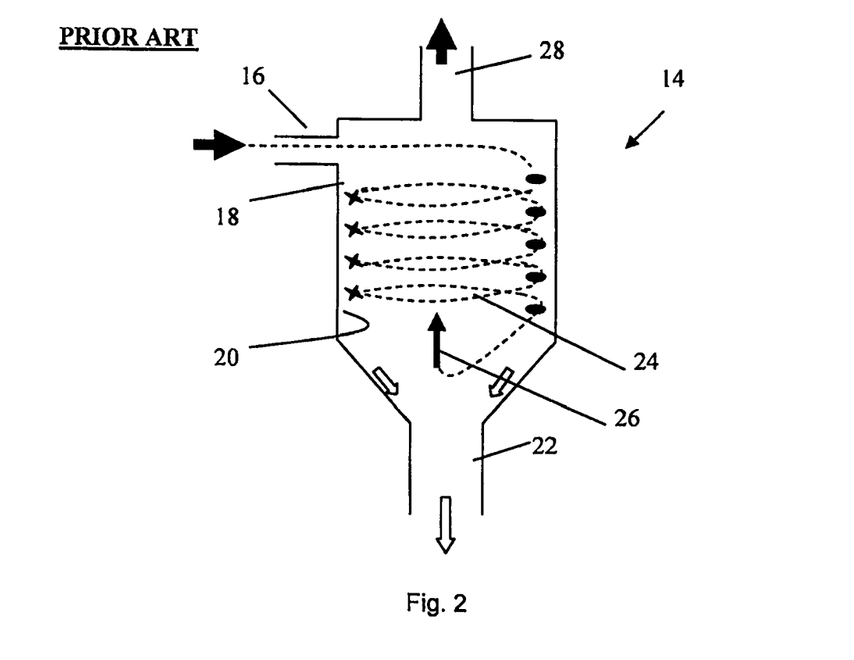
FIG. 2 shows a conventional cyclone.

FIG. 2 shows a conventional cyclone 14. The fluid flow that contains dust from the drilling work is fed into the cyclone 14 via an inlet 16. The inlet 16 extends tangentially or at an inclined angle with respect to the cyclone's side wall 18. The circular form of the cyclone causes the incoming fluid to rotate. The centrifugal force that is caused by circular fluid flow throws particles of dust towards the cyclone's inner wall 20. After particles of dust have hit the wall 20 they lose their kinetic energy and fall downwards through an outlet 22 for solid/fluid material in the lower part of the cyclone 14, into a sack or a container that is located under the cyclone 14. The fluid flows from the inlet 16 to the outlet 28. The outlet 22 for solid/fluid material can not be open otherwise, if there is an overpressure in the cyclone, the fluid would flow out through outlet 22 and if there is an underpressure in the cyclone, fluid would be forced into the cyclone 14 through the outlet 22.

A double vortex is created in the cyclone when the cyclone is in use. A main vortex 24 that whirls downwards, carries the coarser/heavier particles of dust. An inner vortex 26 (that is represented by an arrow in FIG. 2), which is created in the lower part of the cyclone 14 and that whirls upwards, carries the finer/lighter particles of dust out of the cyclone 14 through an air outlet 28. The finer/lighter particles of dust that are carried by the inner upwardly directed vortex 26 are sucked up by a dust sucker 30 via a second suction hose 32 (that is shown in FIG. 1) that is connected to the cyclone's air outlet 28.

Figure 3:
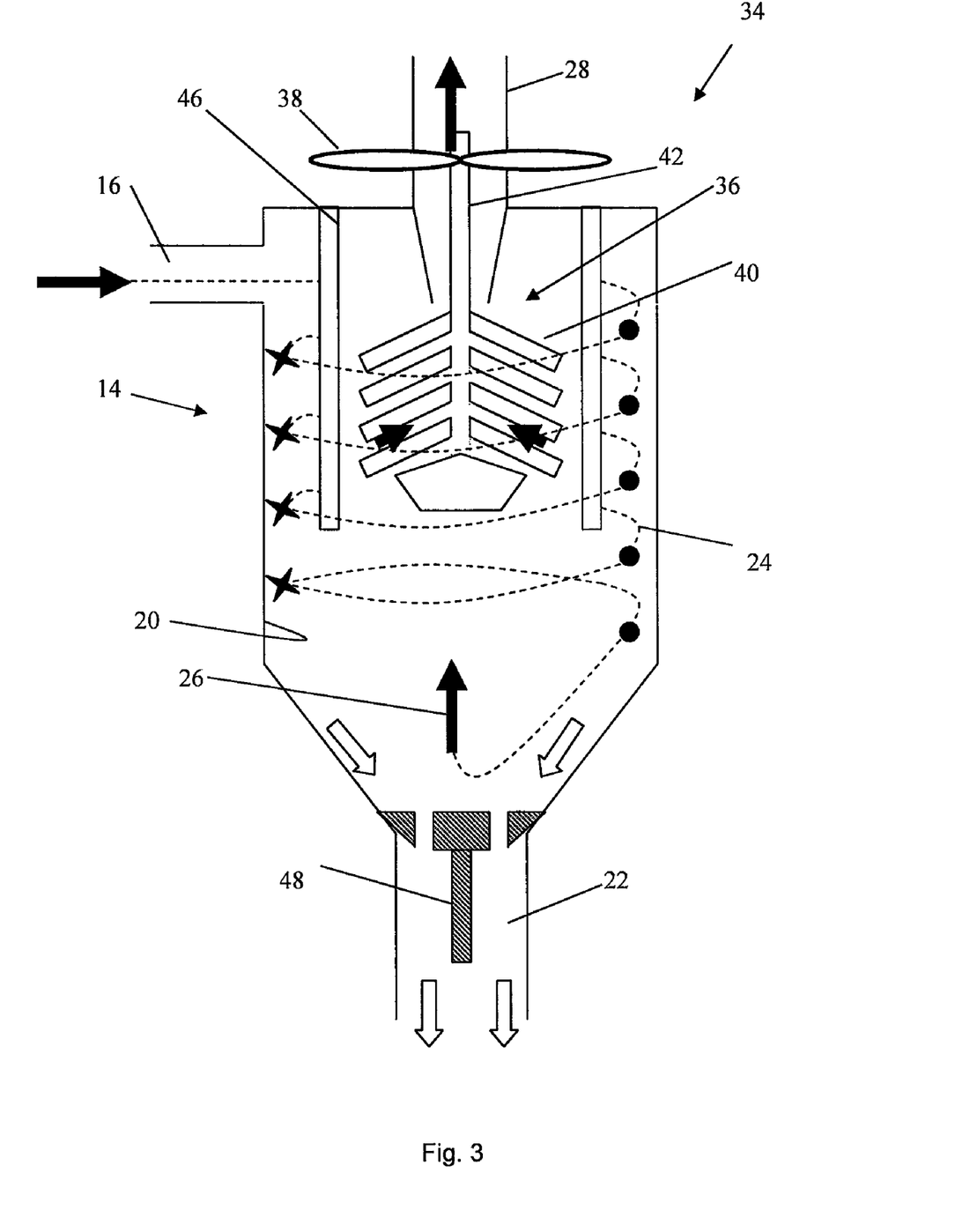
FIG. 3 shows a device according to an embodiment of the invention.

FIG. 3 shows a device 34 for separating solid particles with a maximum size of up to 2 cm out of a gas according to an embodiment of the invention. Air that carries particles, that have been created by a drilling machine for example, enter the cyclone through the inlet 16. A downwardly directed vortex 24 that carries coarser/heavier particles towards the cyclone's lower part and an inner upwardly directed vortex 26 that carries finer/lighter particles towards the cyclone's upper part are created in the cyclone when the cyclone is in use. The rotation direction of the centrifuge is the same as the rotation direction for the fluid in the cyclone 14. The centrifugal force that is caused by the circular fluid flows in the cyclone 14 throws particles towards the cyclone's inner wall 20. After the particles of dust have hit the wall 20, the fall out of the cyclone 14 through the outlet 22. The cyclone's inner wall 20 can comprise ribs, or a rough surface to increase friction between the wall 20 and the particles. Furthermore, the device 34 can comprise means (not shown), that are for example located in the inlet 16 and/or in the lower part of the cyclone 14, to add a binding agent to the particles and/or drops of solid/fluid material that pass through the device 34.

The device 34 also comprises a contra-flow centrifuge 36 that is arranged to rotate at a speed of 4000-6000 revolutions per minute, for example at 6000 revolutions per minute. The centrifuge 36 preferably rotates at a speed that is higher than the calculated fluid speed in the cyclone.

A fan 38 is arranged downstream of the centrifuge 36 to create an underpressure in the device's outlet 28 and force a fluid flow through the whole device 34. Alternatively, the device could comprise means to create an overpressure that forces a fluid flow through the device 34. A single motor, such as a hydraulic or electric motor, can be used to drive the fan 38 and the centrifuge 36. The centrifuge 36 comprises a plurality of parallel lamellae 40 that are arranged coaxially on a central shaft 42 and that are arranged at an inclined angle with respect to the central shaft 42. In the illustrated embodiment the lamellae 40 are angled downwards; the lamellae 40 could however be angled upwards or arranged at a right angle to the central shaft 42.

The illustrated device 34 has a compact structure because the centrifuge 34 is mounted inside the cyclone 14. The centrifuge 36 could however be mounted outside the cyclone 14.

The lamellae 40 are arranged at a distance of less than 1 mm from each other so that gas channels are formed between adjacent lamellae 40. Gas and dust in the inner upwardly directed vortex 26 are forced into the radially outer region around the centrifuge's lamellae 40 and brought to rotate with the centrifuge 36 along the mantle surface of a cone or at least a partly cone-formed body arranged with its line of symmetry coaxial with the centrifuge's axis of rotation. The centrifugal force causes particles of dust to be thrown outwardly towards a stationary or rotating casing 46 around the centrifuge 36. The casing 46 separates the downwardly directed vortex 24 from the air that enters the centrifuge 36 so that these air flows do not disrupt one another. Particles of dust that hit the casing 46 fall down into the lower part of the cyclone 14 and fall through the outlet 22. The air that enters the centrifuge 36 flows in between the lamellae 40 and thereafter out of the device 34 through the outlet 28. The substantially dust-free air that flows out through the outlet 28 may for example be released into the surrounding air or be fed to a tool for example, via one or more filters, if this is desired or necessary.

The fan 38 can be used to clean the centrifuge 36 when the centrifuge is not in use by using it to blow a cleaning fluid, such as pressurized air or water, through the centrifuge 36.

Figure 4:
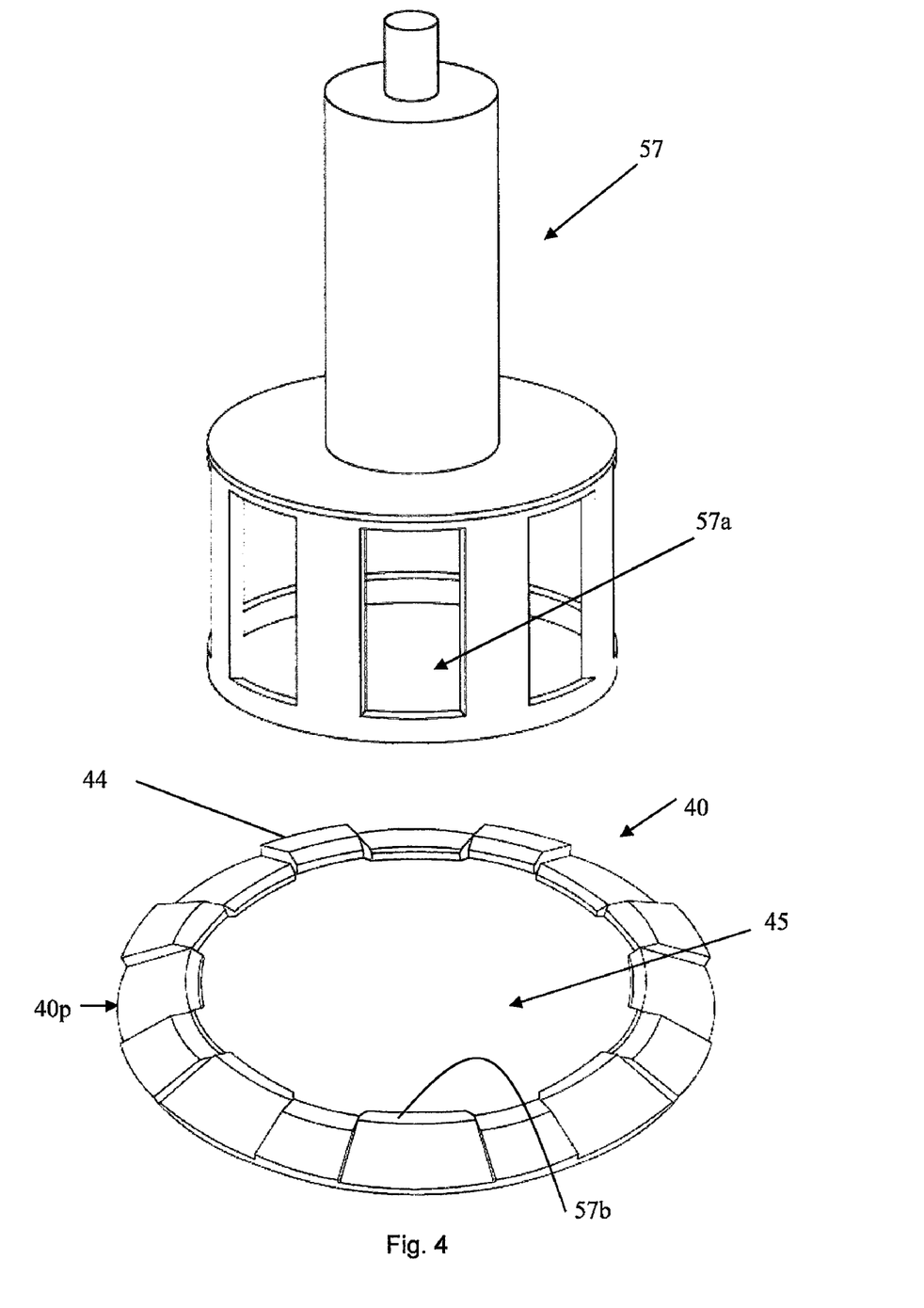
FIG. 4 shows a lamella and a tubular central shaft according to an embodiment of the invention.

FIG. 4 shows a substantially flat circular lamella 40 with a central hole 45, which lamella 40 comprises a plurality of spacer elements 44 that extend substantially radially from the central hole to the lamella's periphery 40p. It should be noted that the centrifuge 36 can alternatively comprise at least one lamella of any suitable shape, such as a conical lamella. The spacer elements 44 can be straight, curved or spiral-formed. The lamellae 40 can be arranged with a coarse surface to increase friction between the lamellae's surface and the fluid. The lamellae 40 can comprise metal, sintered carbide, rubber, a polymer, ceramic material and can even be arranged with a coating material, such as a durable surface coating to better withstand erosion. The outer diameter of a lamella 40 can be 150-250 mm. The inner diameter of a lamella 40 can be 100-200 mm. Each lamella 40 in a lamella packet can for example have an outer diameter of 200 mm and an inner diameter of 150 mm. The centrifuge's shaft and/or a lamella can be arranged with means, such as flanges 57b, to attach the lamellae 40 to the shaft 57, for example by placing the flanges 57b into the openings 57a in the lower part of the shaft 57. The lamellae 40 can however be attached to the shaft 57 in any suitable removable or non-removable way.

A plurality of lamellae 40 is arranged to be attached to the outside of the lower part of a hollow shaft 57 to form a lamella packet 36a.

Figure 5:
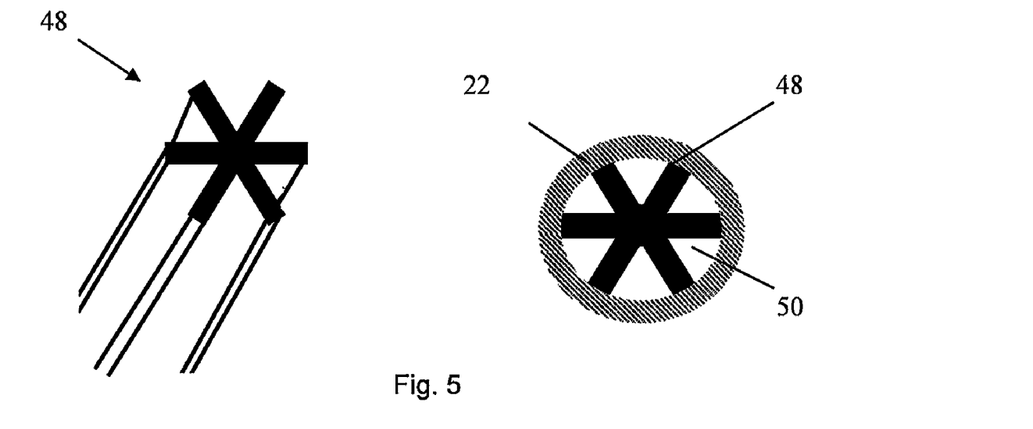
FIGS. 5 & 6 show an element that is arranged in the outlet of a device according to two different embodiments of the invention.

FIG. 5 shows a perspective view of an element 48 that is arranged to be placed in a cyclone's outlet 22 for solid/fluid material and the same element 46 from above when it has been placed in the outlet 22 of a cyclone or a device according to the present invention. The element 48 comprises rubber plastic, and/or metal for example and is brought to rotate by a motor (not shown) when the cyclone is in use. The element 46 in the illustrated embodiment is star-shaped, but it can be of any suitable shape. The illustrated element 48 comprises six openings 50 through which dust can pass from the inside of a cyclone and out of the cyclone 14, or a device 34 according to an embodiment of the invention, when the cyclone 14 or the device 34 is in use, without having to interrupt its operation. The element 48 forms a number of longitudinal channels 50 together with the cyclone's outlet.

Figure 6:
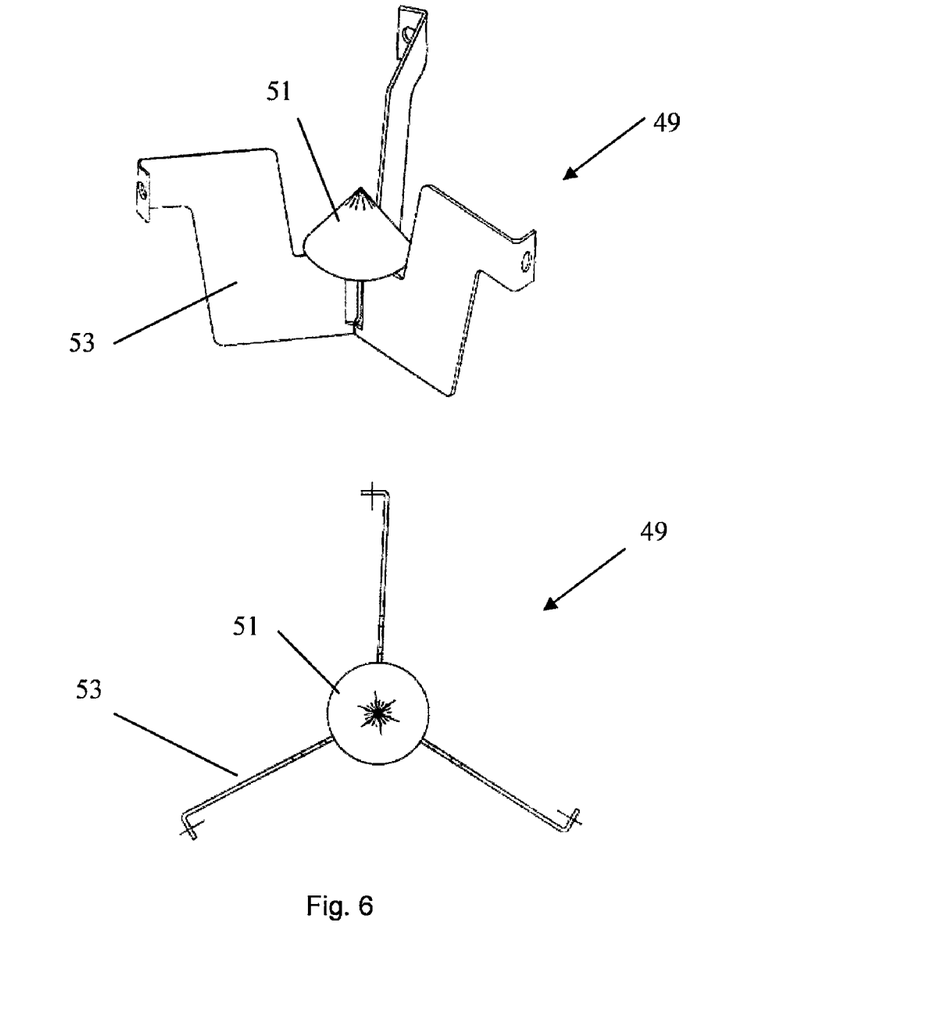

FIG. 6 shows a perspective view of an element 49 that is arranged to be placed in a cyclone's outlet 22 for solid/fluid material and the same element 49 from above. The element 49 comprises a vortex turner 51 and stop plates 53 in the form of a cross, which stop plates 53 are arranged to prevent particles and/or drops of solid/fluid material outside the cyclone from being pulled into the cyclone. The element 49 can be arranged to be attached to a raisable and lowerable organ so that the element's 49 height in relation to the cyclone's outlet can be adjusted so that the stop plates can be placed in an optimal position to achieve efficient separation of solid/fluid material out of the cyclone. It should be noted that the vortex turner 51 can be arranged to be displaceable with respect to the stop plates 53 so that the stop plates' height with respect to the vortex turner 51 can be adjusted.

Figure 7:
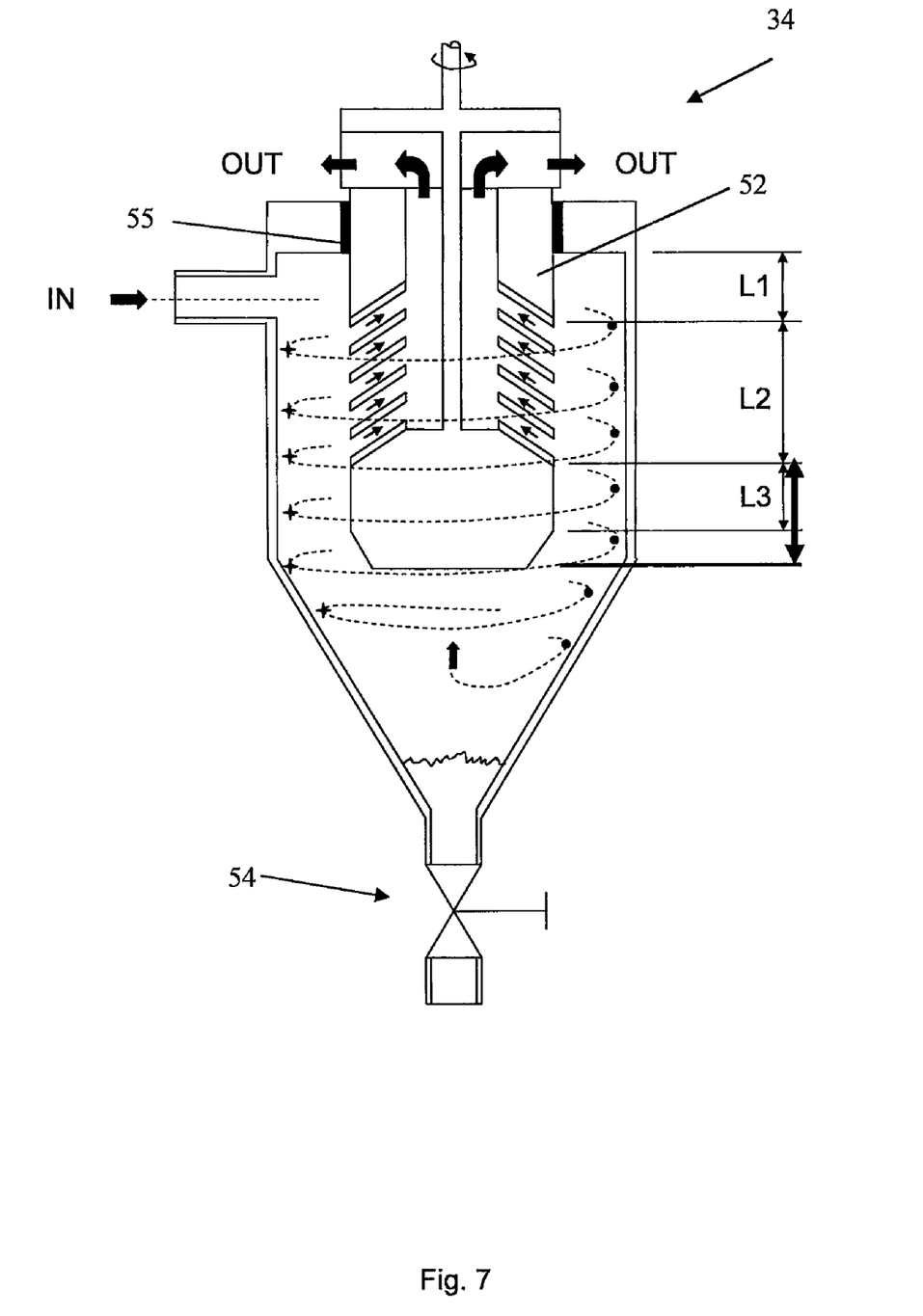
FIGS. 7-11 show devices according to further embodiments of the invention.

FIG. 7 shows a device 34 according to another embodiment of the invention. The dimensions L1, L2 and L3 are adapted so that the particle load on the centrifuge 34 is as small as possible, which consequently provides for better separation and reduces erosion (wear). The illustrated centrifuge 34 comprises a straight portion 52 (L1) that does not have lamellae. The dimension L1 of this straight portion 52 is chosen so that the lamellae of the centrifuge are not subjected to direct blasting from the device's inlet. L2 varies depending on the number of lamellae in the lamella packet, their thickness and the distance between the lamellae. Portion L3 may be needed to maintain the circular fluid speeds in the device. The dimension L3 is chosen on the basis of the cone angle to so that it functions to force air upwards so that it flows with the same speed that the surface of the lamellae move during rotation in order to achieve an optimal separation. The outlet 22 comprises a valve 54 such as a ball valve, single leaf damper valve, one-way valve, wheel valve, a pressed rubber tube, check valve, shunt valve or a hydraulic lock etc. The valve 54 can be controlled via controllers on the valve, i.e. by a computer program, relay circuit or the like. The fan (the pump) in the device 34 is a centrifugal fan.

It should be noted that emptying of the cyclone 14 can be carried out in many different ways. When using a flattened rubber tube the emptying takes place when the pressure (the amount of particles in the cyclone 14) becomes high and the valve 54 is opened. The more traditional valve can be opened when, for example the mass (the weight) of the whole device 34 becomes high, which thus indicates that there are a lot of particles in the cyclone 14. The valve 54 can also be opened, for example, for a determined time interval or when there a certain pressure change occurs in the cyclone, among other things The lamella packet of the centrifuge 36 can be conical instead of the cyclone 14. Even here the most suitable position for the lamella packet of the centrifuge 36 is determined by placing it at a suitable position in the cyclone 14 (where there is least particle load).

Figure 8:
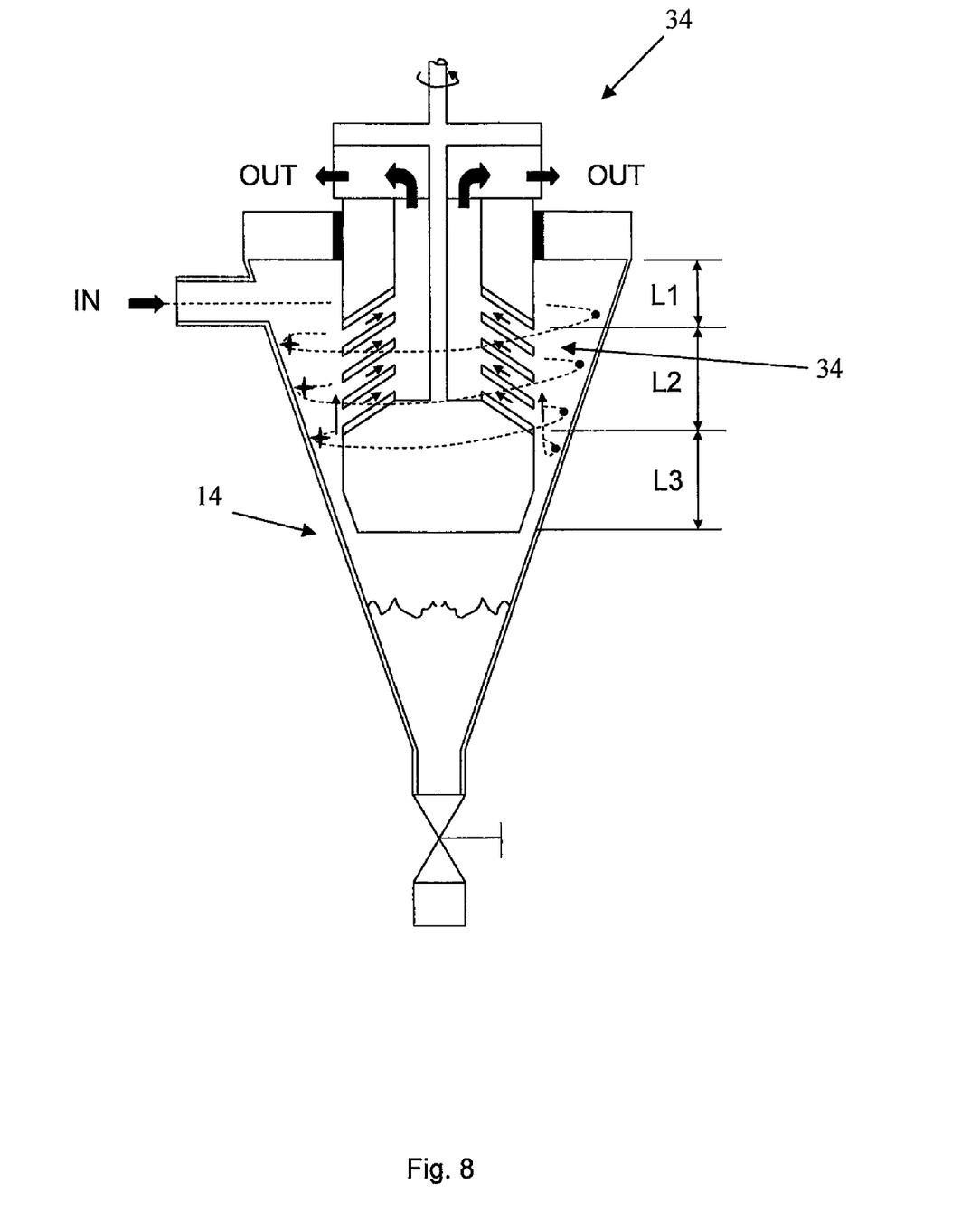

FIG. 8 shows a device 34 according to a further embodiment of the invention. In the illustrated embodiment the cyclone 14 is conical in order to better maintain/create a vortex, whereby the coarsest/heaviest particles and/or drops of solid/fluid material will then be separated with help from centrifugal forces on the way down.

Figure 9:
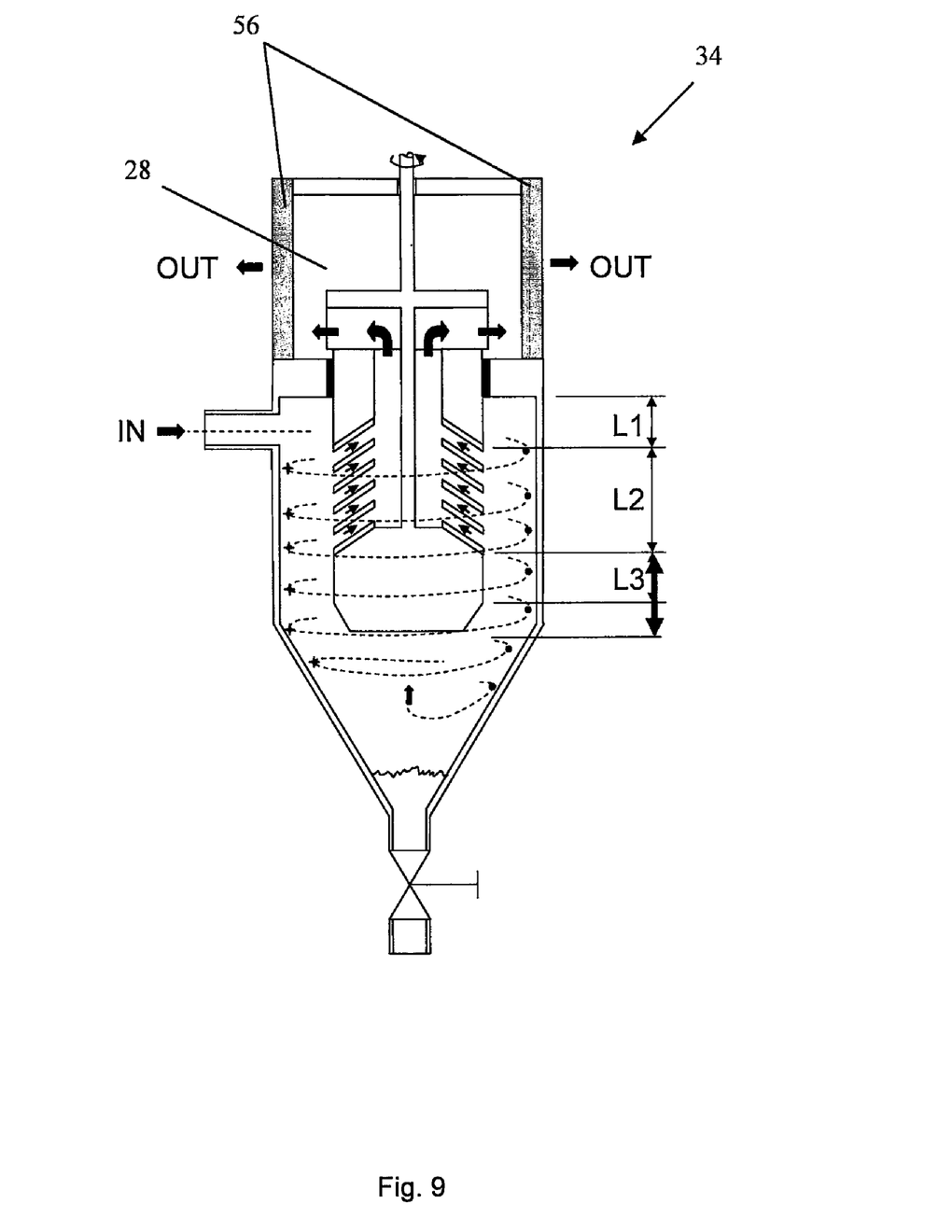

FIG. 9 shows a device 34 according to a further embodiment of the invention. The device 34 comprises a filter 56 on the outlet 28.

Figure 10:
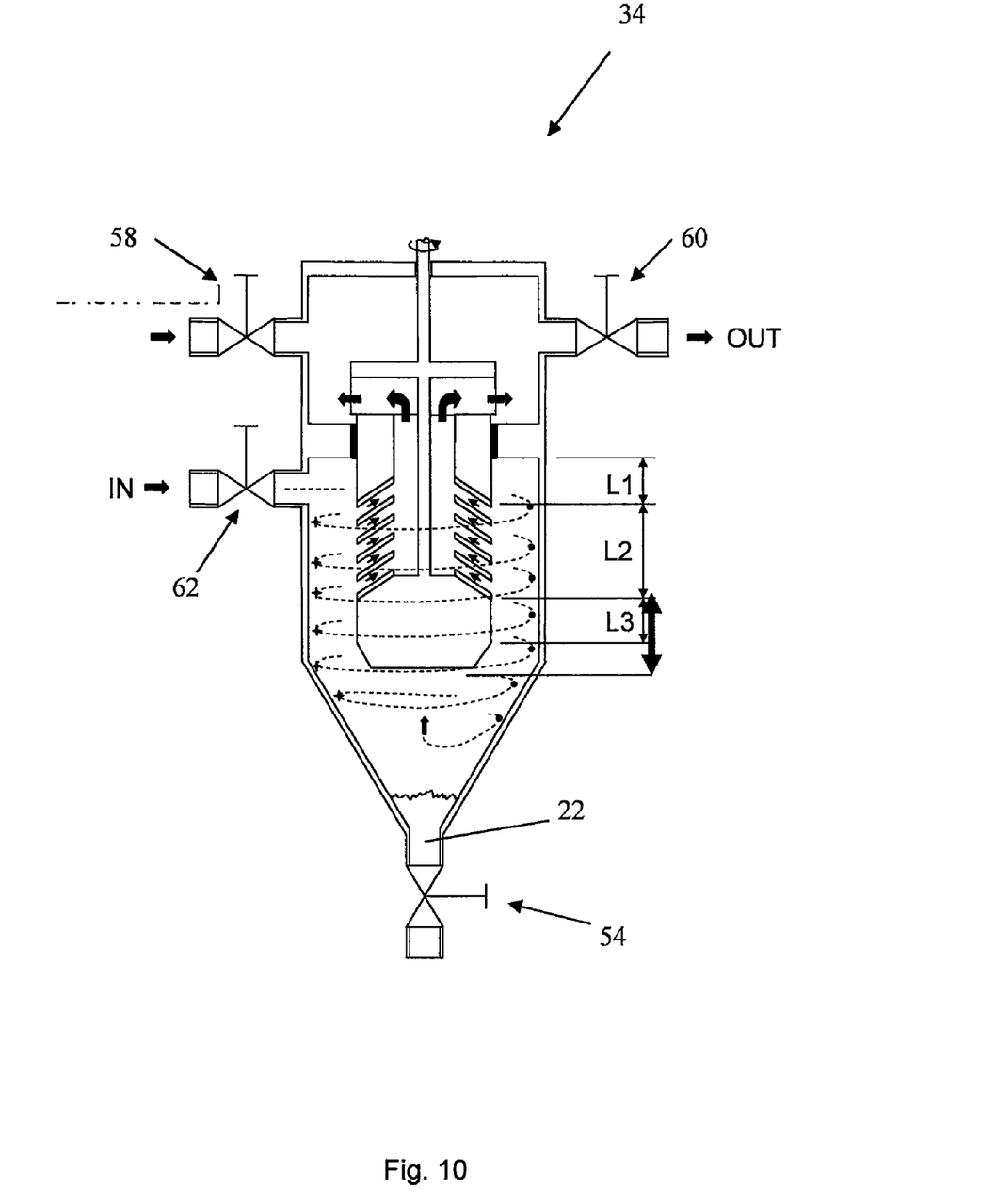

FIG. 10 shows a device 34 according to a further embodiment of the invention. In the illustrated embodiment the centrifuge 36 can be cleaned by changing the direction of rotation of the fan (the pump), which consequently changes the flow direction. Another way to clean the device is to connect, for example, external pressurized air to a flushing inlet. 58. Cleaning may be carried out by closing the outlet valve 60, which consequently forces clean blasting air through the centrifuge 36. If the inlet valve 62 and the valve 54 in the opening 22 are also closed, the whole device may be blown clean. The valves 54, 58, 60, 62 can be opened and/or closed manually or automatically via control signals from computers for example.

The devices that are shown in FIGS. 7-10 comprise an integrated fan (not shown) that creates an underpressure that forces the flow through the devices and a seal 55 that seals the inside of the cyclone from the surroundings. The illustrated lamella packet in each one of the FIGS. 7-10 comprises the tubular central shaft and the lamellae that are shown in FIG. 4, and a cone with a flat bottom is connected to the lamella packet and arranged to rotate therewith.

Figure 11:
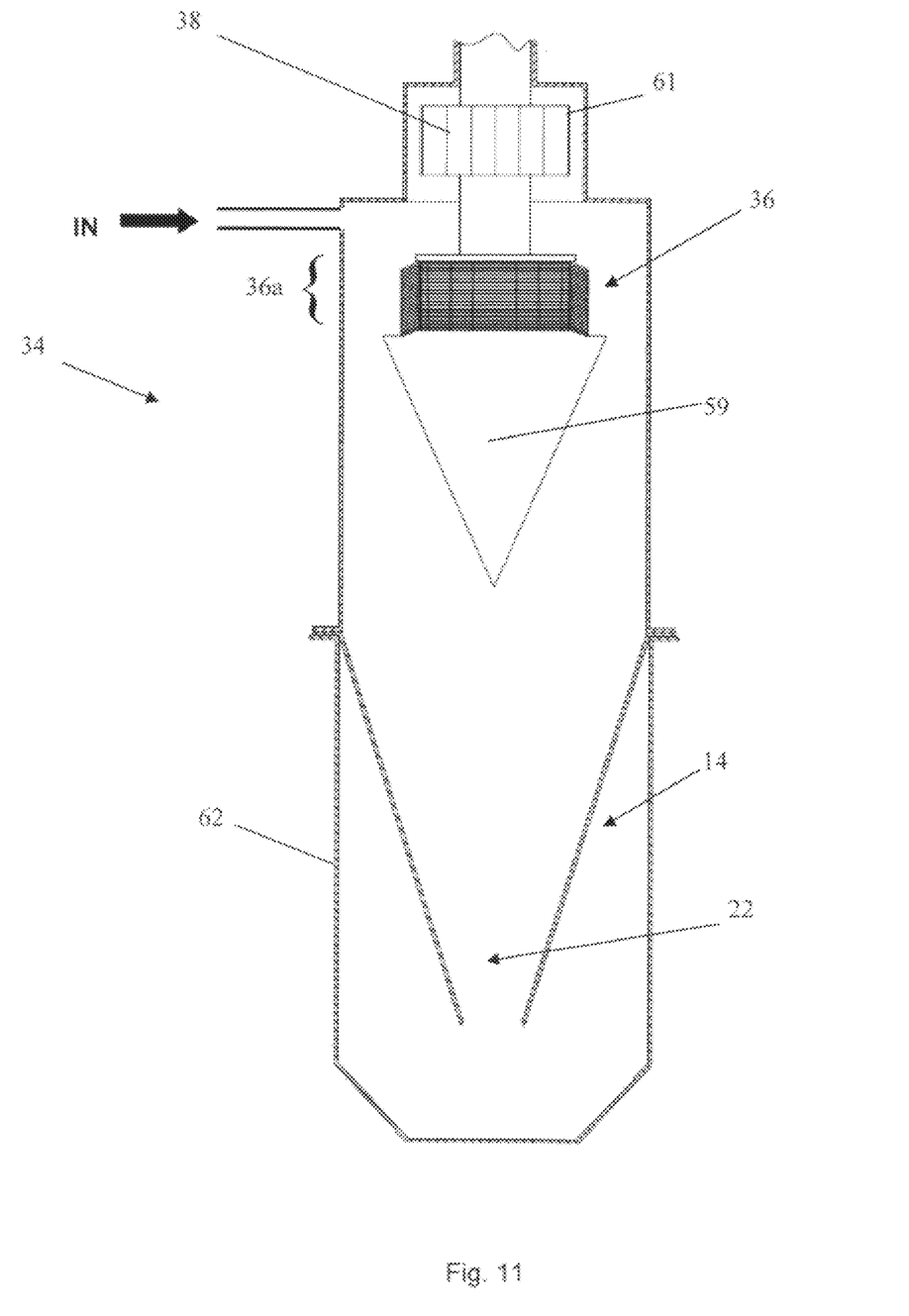

FIG. 11 shows parts of a device 34 according to an embodiment of the invention. The device comprises an integrated fan housing 61 that contains a fan 38. The centrifuge 36 comprises a lamella packet 36a with a plurality of lamellae 40, for example ten lamellae, that are arranged at a distance of 3 mm from one another, an inner tubular shaft and a cone 59. The tubular shaft and the lamellae 40 may, for example, comprise means, such as a flange and corresponding holes to facilitate the attachment of the lamellae 40 to the shaft. Alternatively, the lamellae 40 and the shaft can form an integrated lamella packet together with, or without, the fan 38, which integrated unit can be arranged to be raisable and lowerable in order to facilitate cleaning and maintenance work. The cone's 59 surface is, for example, arranged to have the same inclination as the cyclone's 14 walls.

The device 34 also comprises a collector vessel 62 to collect solid/fluid material that is distanced from the cyclone 14 through the cyclone's outlet 22 and to encapsulate and thereby protect the cyclone 14 from blows and impacts that it can be subjected to during its use and/or transportation. The cyclone's outlet 22 can comprise a compressible part (not shown), such as a rubber tube, that is arranged to be compressed and thereby to prevent material from passing therethrough when the device 34 is not in use.

Figure 12:
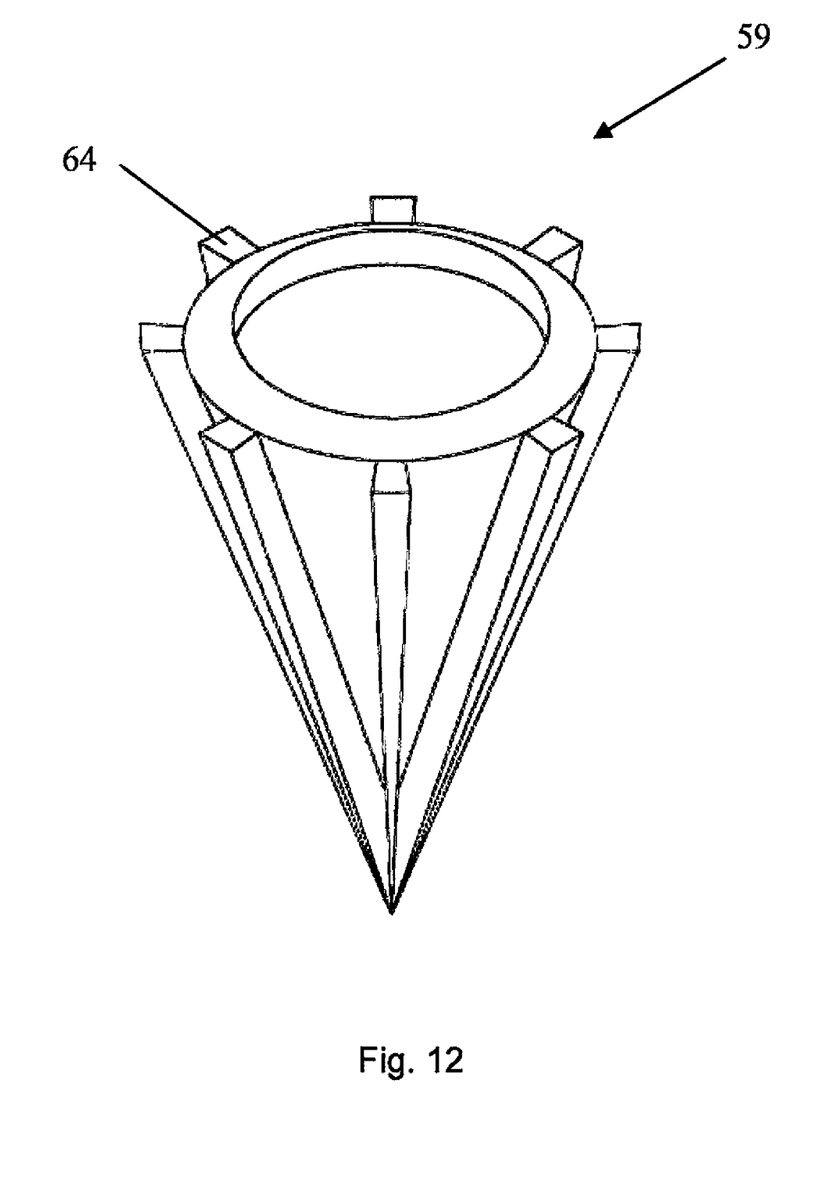
FIG. 12 shows a cone according to an embodiment of the invention.

FIG. 12 shows a cone 59 that comprises a number of ribs 64, eight ribs in the illustrated embodiment, which ribs extend along the cone's surface from the cone's tip to its periphery, which ribs 64 are used to increase the speed of the upwardly moving fluid up to the lamellae's periphery when the device is in use and thereby increase the rotation of the cone, the fluid flow's speed around the cone 59 and thereby the fluid flow upwards along the cone 59 and up to the gaps between the lamellae 40.

It should be noted that features shown in the drawings in connection with one embodiment of the invention can be combined with features shown in other drawings in connection with another embodiment of the invention.

Many modifications of the invention would be apparent for a skilled person. For example the device could be used to separate particles of solid material of different sizes/weight from one another.

The invention claimed is:

1. Device (34) for separating particles and/or drops of solid/fluid material out of a fluid, which device comprises a cyclone (14) with an inlet (16) and an outlet (28), and a centrifuge (36) that is arranged to separate particles and/or drops of solid/fluid material from the outlet fluid in said cyclone (14), characterized in that said centrifuge (36) is located downstream of the cyclone (14) and is located in the cyclone (14), that the centrifuge's axis of rotation is arranged to extend in the same direction as the cyclone's axis of rotation and that the centrifuge (25) comprises a plurality of lamellae (40) that is arranged coaxially on a shaft (42) at a distance from one another so that fluid channels are formed between adjacent lamellae (40) and so that fluid flows in between adjacent lamellae (40) in a direction from the lamellae's periphery (40p) towards said shaft (42) when said centrifuge (36) is in use, and wherein said device (34) comprises a component (59) to increase the speed of fluid moving upwards towards said lamellae (40).

2. Device (34) according to claim 1, characterized in that the device (34) comprises an integrated fan housing (55) that is arranged to contain a fan (38) that creates an underpressure that forces a flow through the device (34).

3. Device (34) according to claim 2, characterized in that it comprises a motor that drives said fan (38) and said centrifuge (36).

4. Device (34) according to claim 1, characterized in that said centrifuge's (36) axis of rotation is coaxial to the cyclone's (14) axis of rotation.

5. Device (34) according to claim 1, characterized in that said lamellae (40) are arranged at a right angle to the shaft (42).

6. Device (34) according to claim 1, characterized in that said lamellae (40) are arranged at an inclined angle to the shaft (42).

7. Device (34) according to claim 1, characterized in that at least one of said lamellae (40) comprises at least one spacer element (44).

8. Device (34) according to claim 7, characterized in that said at least one spacer element (44) extends substantially radially from the lamella's periphery (40p) to said shaft (42).

9. Device (34) according to claim 1, characterized in that said shaft (42) is substantially tubular.

10. Device (34) according to claim 1, characterized in that it said component to increase the speed of fluid moving upwards towards said lamellae (40) comprises a cone (59) that is connected to said centrifuge (25) and that is arranged to rotate with it.

11. Device (34) according to claim 10, characterized in that said cone's (59) surface comprises at least one rib (64) or groove to guide and force upwardly moving fluid towards the lamellae's periphery (40*p*) when the device (34) is in use.

12. Device (34) according to claim 1, characterized in that the cyclone's (14) lower part comprises an outlet (22) and an element (49) that is arranged in said outlet (22) and that comprises a vortex turner (51).

13. Device (34) according to claim 12, characterized in that said element (49) comprises stop plates (53) that are arranged to prevent particles and/or drops of solid/fluid material outside said cyclone (14) from being pulled into said cyclone (14).

14. Device (34) according to claim 12, characterized in that said element (49) is arranged to be raiseable and lowerable.

15. Device (34) according to claim 1, characterized in that it comprises a compressible part, such as a rubber tube, which compressible part is arranged to be compressed when there's an underpressure in the cyclone (14).

16. Device (34) according to claim 12, characterized in that it comprises a collector vessel (62) for particles and/or drops of solid/fluid material, which collector vessel (62) is located at, at or downstream of the cyclone's outlet (22).

17. Device (34) according to claim 16, characterized in that said collector vessel (62) substantially surrounds the cyclone (14).

18. Device (34) according to claim 1, characterized in that said centrifuge (36) comprises a lamella packet (36*a*) with a dimension L2 in the device's longitudinal direction, a first component downstream of the lamella packet (36*a*) with a dimension L1 in the device's longitudinal direction and a second component upstream of the lamellae packet (36*a*) with a dimension L3 in the device's longitudinal direction.

19. Device (34) according to claim 18, characterized in that L1 is 20-40 mm, L2 is 120-140 mm and L3 is 200-600 mm.

20. Dust separator, characterized in that it comprises a device (34) according to claim 1.

21. Machine (10), such as a drill rig, characterized in that it comprises a device (34) according to claim 1.

22. Method for separating particles of solid/fluid material out of a fluid, which method comprises:

leading a fluid containing particles of solid/fluid material into a cyclone (14) with an inlet (16) and an outlet (28), characterized in that the particles and/or drops of solid/fluid material are separated from the outlet fluid in said cyclone (14) by a centrifuge (36) that is located downstream of the cyclone (14), that is located in the cyclone (14), whose axis of rotation is arranged to extend in the same direction as the cyclone's axis of rotation and that comprises a plurality of lamellae (40) that is arranged coaxially on a shaft (42) at a distance from each other so that fluid channels are formed between adjacent lamellae (40) and so that the fluid flows in between adjacent lamellae (40) in a direction from the lamellae's periphery (40*p*) to said shaft (42).

23. Device (34) according to claim 13, characterized in that said element (49) is arranged to be raiseable and lowerable.

24. Machine (10), such as a drill rig, characterized in that it comprises a dust separator according to claim 20.

\* \* \* \* \*